ered Statees Patent [19]

Hammer et al.

[11] 3,847,643
[45] Nov. 12, 1974

[54] SURFACE TREATMENT OF FLUORESCENT LAMP BULBS AND OTHER GLASS OBJECTS

[75] Inventors: Edward E. Hammer, Mayfield Village; William C. Martyny, Lyndhurst, both of Ohio

[73] Assignee: General Electric Company, Schenectady, N.Y.

[22] Filed: Jan. 22, 1973

[21] Appl. No.: 325,431

[52] U.S. Cl. ........... 117/33.5 L, 65/30, 117/33.5 R, 117/69, 117/95, 117/123 B, 313/109, 313/221
[51] Int. Cl. .......................... H01j 1/62, H01j 63/04
[58] Field of Search ........ 117/33.5 R, 33.5 L, 47 H, 117/123 R, 126 R, 94; 313/221, 109; 65/30

[56] References Cited
UNITED STATES PATENTS

| 2,706,691 | 4/1955 | Schaeter | 117/33.5 L |
| 3,377,494 | 4/1968 | Repsher | 117/33.5 L |
| 3,141,990 | 7/1964 | Ray | 313/221 |
| 3,541,376 | 11/1970 | Sadoski et al. | 117/33.5 L |
| 3,379,917 | 4/1968 | Menelly | 313/109 |
| 2,607,014 | 8/1952 | Roy et al. | 313/109 |
| 2,418,202 | 4/1947 | Stanworth | 117/33.5 L |
| 2,533,809 | 12/1950 | Hushley et al. | 250/164 |
| 2,586,304 | 2/1952 | Coltman | 250/80 |
| 3,067,356 | 12/1962 | Ray | 313/221 |
| 3,102,049 | 8/1963 | Quick | 117/94 |
| 3,599,029 | 8/1971 | Martyny | 313/109 |

*Primary Examiner*—William D. Martin
*Assistant Examiner*—William R. Trenor
*Attorney, Agent, or Firm*—Norman C. Fulmer; Lawrence R. Kempton; Frank L. Neuhauser

[57] ABSTRACT

A solution containing tetrabutyl titanate and aluminum-s-butoxide combined with tri-n-butyl antimonite and/or tri-n-butyl borate, along with suitable solvents such as butyl acetate and binders such as ethyl cellulose, is applied to a glass surface such as that of a fluorescent lamp bulb. Upon air heating to a temperature of 400° C or greater, the glass surface characteristics are improved by becoming harder and stronger. When such a treatment is applied to the interior of a fluorescent lamp bulb, the treated glass surface also acts as a barrier against alkali materials within the glass and also improves phosphor adherence. When the treated bulb is made into a fluorescent lamp, improved phosphor maintenance and less end darkening are realized.

11 Claims, 3 Drawing Figures

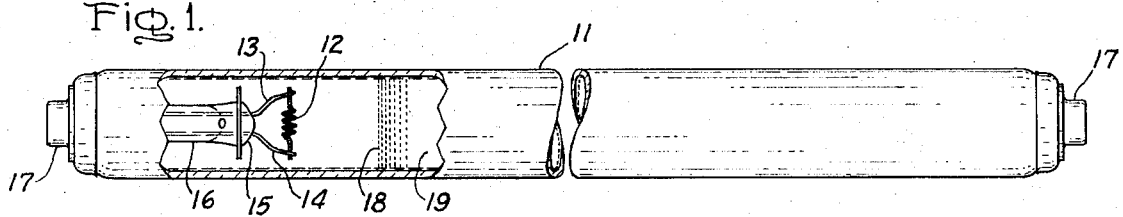
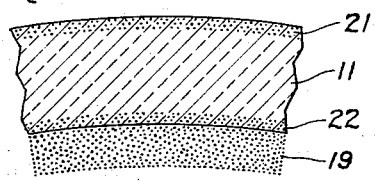
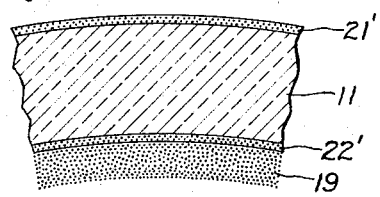

SURFACE TREATMENT OF FLUORESCENT LAMP BULBS AND OTHER GLASS OBJECTS

CROSS-REFERENCE TO RELATED APPLICATION

Ser. No. 272,489, filed July 17, 1972, William C. Martyny and Ronald J. Olwert, "Surface Treatment of Fluorescent Lamp Bulbs and Other Glass Objects," assigned the same as this invention.

BACKGROUND OF THE INVENTION

The invention is in the field of coating and surface-treating glass, particularly the interior and/or exterior surfaces of glass bulbs for lamps and the like.

Numerous materials have been proposed and used as coatings on glass objects such as lamp bulbs, for achieving improved characteristics and performance. Elongated fluorescent lamp bulbs have been given considerable attention in the way of protective coatings, both on the exterior and interior of the bulb. The above-referenced patent application discloses a glass-treating material comprising a solution of aluminum-s-butoxide [$Al(OC_4H_9)_3$] combined with either or both of tetrabutyl titanate [$Ti(OC_4H_9)_4$] and tributyl antimony [$Sb(C_4H_9)_3$]. The solution, in combination with suitable thinners and binders, is applied to the surface of the glass and heated to about 400° C or higher, during which the material reacts with the glass surface. The primary result is not a coating, but a composite treated glass surface which is strengthened and hardened. Such treatment may be applied to both the exterior and interior surfaces of a fluorescent lamp bulb. The interior treated surface acts as a barrier to alkali materials in the glass and prevents them from reacting with the mercury in a mercury-vapor lamp.

SUMMARY OF THE INVENTION

Objects of the invention are to provide an improved method of treating glass surfaces, and to provide improved glass surface treatment for fluorescent lamp bulbs.

The invention comprises, briefly and in a preferred embodiment, the steps of applying to a glass surface a mixture or solution of aluminum-s-butoxide [$Al(OC_4H_9)_3$] and tetrabutyl titanate [$Ti(OC_4H_9)_4$], combined with tri-n-butyl antimonite [$Sb(OC_4H_9)_3$] and/or tri-n-butyl borate [$B(OC_4H_9)_3$], and heating to a temperature of about 400° C or higher. In applying the invention to a fluorescent lamp bulb, the solution is applied to the interior bulb surface (and also to the exterior bulb surface if desired) and then air dried. A suitable phosphor is then applied onto the treated interior bulb surface. The treated bulb with the phosphor coating is then air heated to a temperature of about 400° C or more, thus simultaneously lehring the phosphor and causing the solution to react with the glass in a manner to improve the phosphor adherence, to provide an alkali barrier, and to harden and strengthen the glass surface. An ethyl cellulose binder preferably is employed in the above-described solution to prevent premature hydrolysis of the materials prior to the step of heating which causes the reaction of the materials with the glass.

BRIEF DESCRIPTION OF THE DRAWING

FIG. 1 is a side view of a fluorescent mercury-vapor lamp made in accordance with a preferred embodiment of the invention, a portion thereof being broken away to show interior details, FIG. 2 is a partial cross section, expanded in scale, through the middle portion of the lamp of FIG. 1, and FIG. 3 is a view similar to FIG. 2, at an intermediate step of the process.

DESCRIPTION OF THE PREFERRED EMBODIMENTS

The lamp shown in the drawing may be of conventional construction except for the method of treating the surfaces of the glass envelope in accordance with the invention, as will be described subsequently. The lamp comprises a sealed envelope 11 of elongated tubular shape, and may be made of conventional soda-lime silica glass. It is provided with the usual filament and/or anode electrode 12 at each end, supported on inlead wires 13, 14 which extend through a glass press 15 in a mount stem 16, to contacts of a base 17. The lamp envelope is filled with an inert gas such as argon or a mixture of argon and neon at a low pressure, for example, 2 millimeters, and a small amount of mercury, at least enough to provide a pressure of about 6 microns during operation of the lamp. The darkened region 18 in FIG. 1 represents the darkening which develops in fluorescent lamps forwardly of the cathodes, unless steps are taken to prevent it from occurring. It is generally referred to as oxide ring and consists of mercury compounds. As will be more fully explained, the glass bulb treatment in accordance with the invention significantly retards the development of this oxide ring. Numeral 19 represents the phosphor coating inside the bulb 11, which, for example, may consist of calcium halophosphate activated with antimony and manganese, or it may consist of any other suitable fluorescent lamp phosphor material.

Prior to sealing the mount stems 16 into the bulb, and prior to applying the phosphor 19 to the bulb, the bulb itself, in accordance with the invention, is treated as follows. A solution is prepared, containing aluminum-s-butoxide and tetrabutyl titanate combined with either or both of tri-n-butyl borate and tri-n-butyl antimonite. This solution is applied to the exterior surface or the interior surface of the bulb 11, or to both, simultaneously, by suitable means such as spraying, or pouring it onto and into the bulb, or immersing the bulb into the solution. The bulb, with the solution on its surface, is then heated by suitable means such as a furnace, to a temperature of at least 400° C to cause the occurrence of a chemical type of reaction of the solution with the surface of the bulb. A temperature of about 600° C is preferred. While the exact nature of this reaction is not fully understood, it is believed that titanium and aluminum ions from the aforesaid solution enter into the surface region of the hot glass. This effects a change in the surface characteristics of the glass bulb, thus producing the desirable characteristics mentioned above in the glass itself, instead of the more conventional prior art method of providing a distinct coating or layer of protective material over the glass surface. In a mercury-vapor lamp, the inner treated glass surface 22 (FIG. 2) acts as a barrier for preventing alkali materials in the glass from reacting with mercury, which would form the oxide ring 18, and it also is found to improve the adherence of the phosphor 19 to the bulb surface. The improved phosphor adherence is believed to be achieved by a reaction with the phosphor by $Sb_2O_3$ and/or $B_2O_3$ which are produced when the coating is heated. The heating also is believed to form a combination of $TiO_2$ and $Al_2O_3$, along with $Sb_2O_3$ and/or $B_2O_3$, which forms a thin layer, discernible only by scientific measuring equipment, on the glass surface of the finished product.

In applying the invention to a fluorescent lamp, it is advantageous to apply the above-mentioned solution to one or both surfaces of the bulb as described above, and permit the solution to dry, either at room temperature or by blowing warm air over the bulb. Then the phosphor coating 19 is applied onto the inner coating of the solution inside the bulb 11, whereupon the bulb is heated as described above to cause a reaction of the protective coating with the glass surface, while at the same time performing the required heating or lehring of the phosphor coating. No additional lehring operations are then needed in the manufacturing process. In FIG. 2, numeral 21 represents the exterior surface region treatment of the bulb 11, and the numeral 22 represents the treated interior surface of the bulb, in accordance with the invention.

In FIG. 3, numerals 21' and 22' designate the coatings on the bulb surfaces prior to the step of heating.

In carrying out the above-described method, preferably a sufficient or excess amount of the aluminum-s-butoxide is used in the solution, at least in the solution used for treating the inner wall indicated by numeral 22 in FIG. 2, so that when the treatment is complete there will be some aluminum oxide present at the inner surface of the glass bulb, which will act as a getter for water vapor and oxygen left in the completed lamp, resulting in easier lamp starting.

Since the above-mentioned basic constituents of the solution employed in treating the bulb surface tend to hydrolyze when exposed to air, when mixing these ingredients together it is found desirable to also mix with them an ethyl cellulose binder which will protect the materials from hydrolysis until they are heated to the above-mentioned temperature of 400° C or higher in causing their chemical reaction with the glass surface. It has been found that the ethyl cellulose binder mixed in with the coating solution will keep the materials in solution form and protected from hydrolysis even after the solution has been coated on the bulb and dried.

A complete and preferred formula for the glass-treating solution, particularly suitable for treating the interior surface of a bulb to which a fluorescent powder or phosphor is to be applied, and also suitable for coating and treating the exterior bulb surface, is as follows:

```
½ ml tri-n-butyl antimonite [Sb(OC₄H₉)₃]
½ ml tri-n-butyl borate [B(OC₄H₉)₃]
5 ml tetrabutyl titanate [Ti(OC₄H₉)₄]
10 ml aluminum-s-butoxide [Al(OC₄H₉)₃]
150 ml thinner (50% naphtha, 50% butyl acetate)
150 ml butanol
40 ml ethyl cellulose binder.
```

The ratios or ranges of the preferred composition can be as follows:

| | |
|---|---|
| tri-n-butyl antimonite | .01 to 1.0% by volume |
| tri-n-butyl borate | .01 to 1.0% by volume |
| ethyl cellulose binder | 5% to 20% by volume |
| thinner/butanol ratio | .01 to 100 by volume |
| aluminum-s-butoxide/tetrabutyl titanate ratio, between 1 to 1 and 3 to 1. | |

With the preferred formulation containing approximately twice the amount of aluminum-s-butoxide as that of the other main organo-metallic ingredients, the above-described aluminum oxide will be produced when the solution is baked, for functioning as a getter of oxygen and water vapor in the finished lamp. The purpose of the thinner in the formula is to take into solution the ethyl cellulose and the organo-metallic materials, i.e., the tetrabutyl titanate, aluminum-s-butoxide, tri-n-butyl borate, and tri-n-butyl antimonite. The purpose of the butanol in the formula is to slow the evaporation rate of the solution when applied to the bulb, and to suitably accept a water binder phosphor coating. As explained above, the solution may be applied to both of the inner and outer surfaces of the bulb, dried, and then a liquid phosphor suspension can be coated into the bulb, dried, and the solution and phosphor can then be baked simultaneously.

The method of the invention is useful with many types of glass, including hard glass, for achieving the objectives of hardening and strengthening the glass surface, and also for acting as a barrier of harmful ingredients in the glass (particularly the alkali in soda-lime glass conventionally used for fluorescent lamp bulbs). The invention also achieves the desired objective of a clear and transparent treated glass surface without reducing light transmission.

The invention is the same as that described in the above-identified patent application, except for the different materials in the solution applied to the glass. It should be noted that the tri-n-butyl antimonite used in this invention is a different material, and has different properties, than the tributyl antimony used in the referenced patent application. The method of this invention provides a superior result over that of the referenced patent application, by improving the phosphor adherence, providing a better alkali barrier, making the glass surface harder and stronger, and making the outer surface more slippery for better handling by automated machinery.

While preferred embodiments of the invention, and modifications thereof, have been shown and described, other embodiments and modifications thereof will become apparent to persons skilled in the art, and will fall within the scope of invention as defined in the following claims.

What we claim as new and desire to secure by Letters Patent of the United States is:

1. A method of treating glass, comprising the steps of applying to the glass surface a mixture containing aluminum-s-butoxide and tetrabutyl titanate and a material selected from the group consisting of tri-n-butyl borate and tri-n-butyl antimonite and a mixture thereof, and heating said glass and mixture to a temperature of at least 400° C, the amount of aluminum-s-butoxide in said mixture being sufficient to cause excess aluminum oxide to be produced and causing said mixture to chemically react with said glass during said heating step.

2. A method as claimed in claim 1, in which said temperature is approximately 600° C.

3. A method as claimed in claim 1, in which the amount of aluminum-s-butoxide in said mixture is approximately twice that of said other materials in the mixture.

4. A method as claimed in claim 1, in which an ethyl cellulose binder is combined with said mixture to prevent premature hydrolysis of the mixture materials prior to said step of heating.

5. A method of treating a glass bulb for an electrical device, comprising the steps of applying to at least one of the inner and outer surfaces of the bulb a mixture containing aluminum-s-butoxide and tetrabutyl titanate and a material selected from the group consisting of tri-n-butyl borate and tri-n-butyl antimonite and a mixture thereof, and heating said bulb and mixture to a temperature of at least 400° C, the amount of aluminum-s-butoxide in said mixture being sufficient to cause aluminum oxide to be produced and causing said mixture to chemically react with the glass of said bulb during said heating step.

6. A method as claimed in claim 5, in which said temperature is approximately 600° C.

7. A method as claimed in claim 1, in which said amount of aluminum-s-butoxide is approximately twice that of said other materials in the mixture.

8. A method as claimed in claim 1, in which an ethyl cellulose binder is combined with said mixture to prevent hydrolysis of the mixture materials prior to said step of heating.

9. A method as claimed in claim 1, in which said bulb is a fluorescent lamp bulb, and including the step of applying a phosphor coating inside said bulb after applying said mixture to the inside of the bulb and prior to said heating, whereby said heating causes a chemical reaction of said mixture with the glass bulb and also lehrs the phosphor.

10. A method as claimed in claim 9, in which butanol is combined with said mixture to facilitate the adherence of said phosphor.

11. A method as claimed in claim 9, in which an ethyl cellulose binder is combined with said mixture to prevent premature hydrolysis of the mixture materials prior to said step of heating.

* * * * *